United States Patent
Ishikawa et al.

(10) Patent No.: US 11,862,765 B2
(45) Date of Patent: Jan. 2, 2024

(54) ELECTROLYTE SOLUTION FOR ALKALI METAL-SULFUR-BASED SECONDARY BATTERY, AND ALKALI METAL-SULFUR-BASED SECONDARY BATTERY

(71) Applicants: THE SCHOOL CORPORATION KANSAI UNIVERSITY, Suita (JP); DAIKIN INDUSTRIES, LTD., Osaka (JP)

(72) Inventors: Masashi Ishikawa, Suita (JP); Yuya Torii, Suita (JP); Satoshi Uchida, Suita (JP); Masaki Yamagata, Suita (JP); Shigeaki Yamazaki, Osaka (JP); Shinichi Kinoshita, Osaka (JP)

(73) Assignees: THE SCHOOL CORPORATION KANSAI UNIVERSITY, Osaka (JP); DAIKIN INDUSTRIES, LTD., Osaka (JP)

( * ) Notice: Subject to any disclaimer, the term of this patent is extended or adjusted under 35 U.S.C. 154(b) by 267 days.

(21) Appl. No.: 16/491,671

(22) PCT Filed: Feb. 19, 2018

(86) PCT No.: PCT/JP2018/005770
§ 371 (c)(1),
(2) Date: Sep. 6, 2019

(87) PCT Pub. No.: WO2018/163778
PCT Pub. Date: Sep. 13, 2018

(65) Prior Publication Data
US 2020/0036043 A1    Jan. 30, 2020

(30) Foreign Application Priority Data
Mar. 8, 2017 (JP) .................................. 2017-043858

(51) Int. Cl.
*H01M 4/583* (2010.01)
*H01M 10/0569* (2010.01)
(Continued)

(52) U.S. Cl.
CPC ......... *H01M 10/0569* (2013.01); *H01M 4/38* (2013.01); *H01M 10/052* (2013.01)

(58) Field of Classification Search
CPC .. H01M 10/0569; H01M 4/38; H01M 10/052; H01M 2300/0037;
(Continued)

(56) References Cited

U.S. PATENT DOCUMENTS

| 2010/0062344 A1 | 3/2010 | Koh et al. | |
| 2012/0064398 A1* | 3/2012 | Kim | H01M 4/625 |
| | | | 429/209 |
| 2015/0072248 A1* | 3/2015 | Watanabe | H01M 10/052 |
| | | | 429/336 |

FOREIGN PATENT DOCUMENTS

| CN | 105731416 A | 7/2016 |
| JP | 2005-108724 A | 4/2005 |

(Continued)

OTHER PUBLICATIONS

Zhao et al., Sulfur-infiltrated porous carbon microspheres with controllable multi-modal pore size distribution for high energy lithium-sulfur batteries, Nanoscale, 2014, 6, 882.*

(Continued)

*Primary Examiner* — Cynthia K Walls
(74) *Attorney, Agent, or Firm* — Sughrue Mion, PLLC

(57) ABSTRACT

An electrolyte solution for an alkali metal-sulfur-based secondary battery, an alkali metal-sulfur-based secondary battery, and a module containing the alkali metal-sulfur-based secondary battery. The electrolyte solution includes a positive electrode containing a carbon composite material (Continued)

that contains a carbon material and a sulfur-containing positive electrode active material. The carbon material has a pore volume ratio (micropores/mesopores) of 1.5 or higher. The electrolyte solution contains a fluorinated ether represented by the following formula (1): $R^{11}$—$(OR^{12})_{n11}$—O—$R^{13}$. In the formula, $R^{11}$ and $R^{13}$ are the same as or different from each other, and are each an alkyl group optionally containing a fluorine atom, with at least one of $R^{11}$ or $R^{13}$ containing a fluorine atom; $R^{12}$ is an alkylene group optionally containing a fluorine atom; and n11 is 0, 1, or 2.

4 Claims, 2 Drawing Sheets

(51) Int. Cl.
*H01M 4/38* (2006.01)
*H01M 10/052* (2010.01)

(58) Field of Classification Search
CPC ......... H01M 2300/0034; H01M 4/625; H01M 4/13; H01M 4/382; H01M 4/362; Y02E 60/10

See application file for complete search history.

(56) References Cited

FOREIGN PATENT DOCUMENTS

| | | | | |
|---|---|---|---|---|
| JP | 2008-218387 | A | 9/2008 | |
| JP | 2010-095390 | A | 4/2010 | |
| JP | 2013-225497 | A | 10/2013 | |
| JP | 2015-069703 | * | 4/2015 | .......... H01M 10/052 |
| JP | 5804557 | B2 | 11/2015 | |
| JP | 2016-100094 | A | 5/2016 | |
| WO | 2008/096729 | A1 | 8/2008 | |

OTHER PUBLICATIONS

Machine translation of JP 2015-069703, retrieved from <www.espacenet.com> on Jun. 14, 2021.*
Extended European Search Report dated Feb. 4, 2021 from the European Patent Office in Application No. 18764388.7.
International Preliminary Report on Patentability with the translation of Written Opinion dated Sep. 10, 2019 issued by the International Bureau in International Application No. PCT/JP2018/005770.
International Search Report of PCT/JP2018/005770 dated Apr. 10, 2018.

* cited by examiner

ELECTROLYTE SOLUTION FOR ALKALI METAL-SULFUR-BASED SECONDARY BATTERY, AND ALKALI METAL-SULFUR-BASED SECONDARY BATTERY

CROSS REFERENCE TO RELATED APPLICATIONS

This application is a National Stage of International Application No. PCT/JP2018/005770 filed Feb. 19, 2018, claiming priority based on Japanese Patent Application No. 2017-043858 filed Mar. 8, 2017.

TECHNICAL FIELD

The invention relates to electrolyte solutions for alkali metal-sulfur-based secondary batteries and alkali metal-sulfur-based secondary batteries.

BACKGROUND ART

Current weight reduction and downsizing of electric appliances promote development of secondary batteries having high energy density. Onboard secondary batteries need to have especially high energy density.

Known secondary batteries include alkali metal-sulfur-based secondary batteries. Alkali metal-sulfur-based secondary batteries have high energy density. Still, the sulfur contained therein exhibits a very high resistance in comparison with positive electrode materials of conventional lithium ion secondary batteries, unfortunately causing a significant decrease in average discharge voltage.

Combination use of sulfur with a carbon material is a known method to reduce the resistance. For example, Patent Literature 1 discloses a mesoporous carbon composite material at least containing mesoporous carbon and sulfur placed in mesopores of the mesoporous carbon. This technique involves dissolution of sulfur during charge and discharge, causing a decrease in battery capacity.

A method of using a specific solvent such as a glyme-based solvent is proposed to reduce dissolution of sulfur. For example, Patent Literature 2 discloses an alkali metal-sulfur-based secondary battery that includes a positive or negative electrode containing at least one sulfur-based electrode active material selected from the group consisting of simple sulfur, a metal sulfide, a metal polysulfide, and an organosulfur compound, an electrolyte solution containing a tetraglyme and an alkali metal salt, and a counter electrode of the positive or negative electrode containing the alkali metal, an alloy containing the alkali metal, or carbon, wherein the mixing ratio by mole of the alkali metal salt to the tetraglyme is 0.50 or higher and 1 or lower, at least part of the tetraglyme and at least part of the alkali metal salt form a complex, and the discharge capacity retention is 85% or higher at the 10th cycle in a charge and discharge test (current density: 1/12 C, charge and discharge voltage: 1.5-3.3 V, discharge conditions: 1/12 C, 30° C.).

Patent Literature 3 discloses a nonaqueous electrolyte secondary battery including a positive electrode that contains simple sulfur, a negative electrode that contains a material capable of occluding and releasing lithium, and a nonaqueous electrolyte, wherein the nonaqueous electrolyte contains a first solvent containing at least one selected from the group consisting of a cyclic ether and a linear ether and a second solvent containing at least one selected from the group consisting of a fluorinated carbonate and a fluorinated ester, and the volume of the first solvent represents more than 50% of the sum of the volumes of the first and second solvents.

Patent Literature 4 discloses an alkali metal-sulfur-based secondary battery including a positive electrode that contains a binding agent and a sulfur-based electrode active material containing at least one selected from the group consisting of simple sulfur, a metal sulfide, a metal polysulfide, and an organosulfur compound, an electrolyte solution containing an ether compound represented by the following formula:

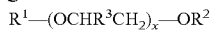

$$R^1-(OCHR^3CH_2)_x-OR^2$$

(wherein $R^1$ and $R^2$ are each individually selected from the group consisting of a C1-C9 alkyl group optionally substituted with fluorine, a phenyl group optionally substituted with a halogen atom, and a cyclohexyl group optionally substituted with a halogen atom, and optionally form a ring together; $R^3$s are each individually H or $CH_3$; and x is 0 to 10) and an alkali metal salt, with at least part of the ether compound and at least part of the alkali metal salt forming a complex, and a negative electrode that is a counter electrode of the positive electrode and that contains the alkali metal, an alloy containing the alkali metal, or carbon, wherein the binding agent is an anionic polymer which is a polymer containing an acidic group, a polymer in the form of an alkali metal salt with the alkali metal serving as a counter cation of the acidic group, or a polymer in the form of a non-alkali metal ion with an ion other than the alkali metal serving as a counter cation of the acidic group.

CITATION LIST

Patent Literature

Patent Literature 1: JP 2010-95390 A
Patent Literature 2: JP 5804557 B
Patent Literature 3: JP 2005-108724 A
Patent Literature 4: JP 2013-225497 A

SUMMARY OF INVENTION

Technical Problem

The techniques of Patent Literature documents 2 and 3 have insufficient cycle performance and a high overvoltage during charge and discharge. These are presumably caused by insufficient prevention of dissolution of sulfur such as lithium polysulfides ($Li_2S_n$ (where n is 1 to 8)) from the positive electrode and a reaction between the dissolved sulfur and the components of the electrolyte solution. In particular, dissolution of $Li_2S_8$ among the lithium polysulfides significantly deteriorates the cycle performance.

Patent Literature 3 proposes to dissolve lithium polysulfides in the nonaqueous electrolyte to saturation in advance, thereby improving the charge and discharge efficiency and the cycle performance. Still, from the viewpoints of battery performance and economic efficiency, a technique requiring no addition of lithium polysulfides is preferred.

In view of the above current state of the art, the invention aims to provide an electrolyte solution that is for an alkali metal-sulfur-based secondary battery, that requires no addition of lithium polysulfides, and that has excellent cycle performance and a low resistance during charge and discharge, and an alkali metal-sulfur-based secondary battery.

Solution to Problem

The inventors have examined solutions to the above issues to find that the use of a carbon composite material that contains a carbon material and a sulfur-containing positive electrode active material as a positive electrode material and the use of an electrolyte solution containing a specific fluorinated ether can reduce generation of $Li_2S_8$ among lithium polysulfides, solving the above issues. Thereby, the inventors have completed the invention.

In other words, the invention relates to an electrolyte solution for an alkali metal-sulfur-based secondary battery that includes a positive electrode containing a carbon composite material that contains a carbon material and a sulfur-containing positive electrode active material, the carbon material having a pore volume ratio (micropores/mesopores) of 1.5 or higher, the electrolyte solution containing:

a fluorinated ether represented by the following formula (1):

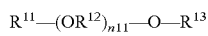

wherein $R^{11}$ and $R^{13}$ are the same as or different from each other, and are each an alkyl group optionally containing a fluorine atom, with at least one of $R^{11}$ or $R^{13}$ containing a fluorine atom; $R^2$ is an alkylene group optionally containing a fluorine atom; and n11 is 0, 1, or 2.

The electrolyte solution of the invention preferably further contains at least one selected from the group consisting of a fluorinated saturated cyclic carbonate, a fluorinated acyclic carbonate, and a fluorinated ester.

In the electrolyte solution, the fluorinated saturated cyclic carbonate is preferably represented by the following formula (2):

[Chem. 1]

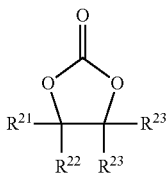

wherein $R^{21}$ to $R^{24}$ are the same as or different from each other, and are each —H, —$CH_3$, —F, a fluorinated alkyl group optionally containing an ether bond, or a fluorinated alkoxy group optionally containing an ether bond, with at least one of $R^{21}$ to $R^{24}$ being —F, a fluorinated alkyl group optionally containing an ether bond, or a fluorinated alkoxy group optionally containing an ether bond.

In the electrolyte solution, the fluorinated acyclic carbonate is preferably represented by the following formula (3):

[Chem. 2]

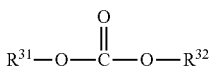

wherein $R^{31}$ and $R^{32}$ are the same as or different from each other, and are each an alkyl group optionally containing an ether bond and optionally containing a fluorine atom, with at least one of $R^{31}$ or $R^{32}$ containing a fluorine atom.

In the electrolyte solution, the fluorinated ester is preferably represented by the following formula (4):

[Chem. 3]

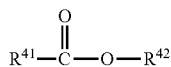

wherein $R^{41}$ and $R^{42}$ are the same as or different from each other, are each an alkyl group optionally containing an ether bond and optionally containing a fluorine atom, and optionally bind to each other to form a ring, with at least one of $R^{41}$ or $R^{42}$ containing a fluorine atom.

The invention also relates to an alkali metal-sulfur-based secondary battery including a positive electrode, a negative electrode, and the above electrolyte solution.

The invention also relates to an alkali metal-sulfur-based secondary battery including a positive electrode, a negative electrode, and an electrolyte solution, the positive electrode containing a carbon composite material that contains a carbon material and a sulfur-containing positive electrode active material, the carbon material having a pore volume ratio (micropores/mesopores) of 1.5 or higher, the electrolyte solution containing a fluorinated ether represented by the following formula (1):

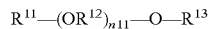

wherein $R^{11}$ and $R^{13}$ are the same as or different from each other, and are each an alkyl group optionally containing a fluorine atom, with at least one of $R^{11}$ or $R^{13}$ containing a fluorine atom; $R^{12}$ is an alkylene group optionally containing a fluorine atom; and n11 is 0, 1, or 2.

In the alkali metal-sulfur-based secondary battery, the electrolyte solution preferably further contains at least one selected from the group consisting of a fluorinated saturated cyclic carbonate, a fluorinated acyclic carbonate, and a fluorinated ester.

In the alkali metal-sulfur-based secondary battery, the fluorinated saturated cyclic carbonate is preferably represented by the following formula (2):

[Chem. 4]

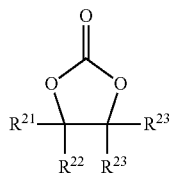

wherein $R^{21}$ to $R^{24}$ are the same as or different from each other, and are each —H, —$CH_3$, —F, a fluorinated alkyl group optionally containing an ether bond, or a fluorinated alkoxy group optionally containing an ether bond, with at least one of $R^{21}$ to $R^{24}$ being —F, a fluorinated alkyl group optionally containing an ether bond, or a fluorinated alkoxy group optionally containing an ether bond.

In the alkali metal-sulfur-based secondary battery, the fluorinated acyclic carbonate is preferably represented by the following formula (3):

[Chem. 5]

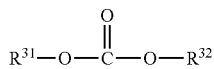

wherein $R^{31}$ and $R^{32}$ are the same as or different from each other, and are each an alkyl group optionally containing an ether bond and optionally containing a fluorine atom, with at least one of $R^{31}$ or $R^{32}$ containing a fluorine atom.

In the alkali metal-sulfur-based secondary battery, the fluorinated ester is preferably represented by the following formula (4):

[Chem. 6]

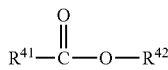

wherein $R^{41}$ and $R^{42}$ are the same as or different from each other, are each an alkyl group optionally containing an ether bond and optionally containing a fluorine atom, and optionally bind to each other to form a ring, with at least one of $R^{41}$ or $R^{42}$ containing a fluorine atom.

Preferably, the alkali metal-sulfur-based secondary battery exhibits a single main discharge plateau on and after the second cycle, and a reaction accompanied by $Li_2S_8$ represents 5% or less of all discharge reactions.

The invention also relates to a module including the above alkali metal-sulfur-based secondary battery.

Advantageous Effects of Invention

The electrolyte solution of the invention has any of the above structures, and thus can lead to an alkali metal-sulfur-based secondary battery having excellent cycle performance. The alkali metal-sulfur-based secondary battery can have a low resistance and a low overvoltage during charge and discharge.

The alkali metal-sulfur-based secondary battery of the invention has any of the above structures, and thus can have excellent cycle performance. The alkali metal-sulfur-based secondary battery exhibits a single discharge plateau without observation of a plateau that corresponds to the reaction range of a polysulfide represented by $Li_2S_8$ in the mesopores during charge and discharge, and thus has a low resistance and a low overvoltage.

DESCRIPTION OF EMBODIMENTS

Figure 1:
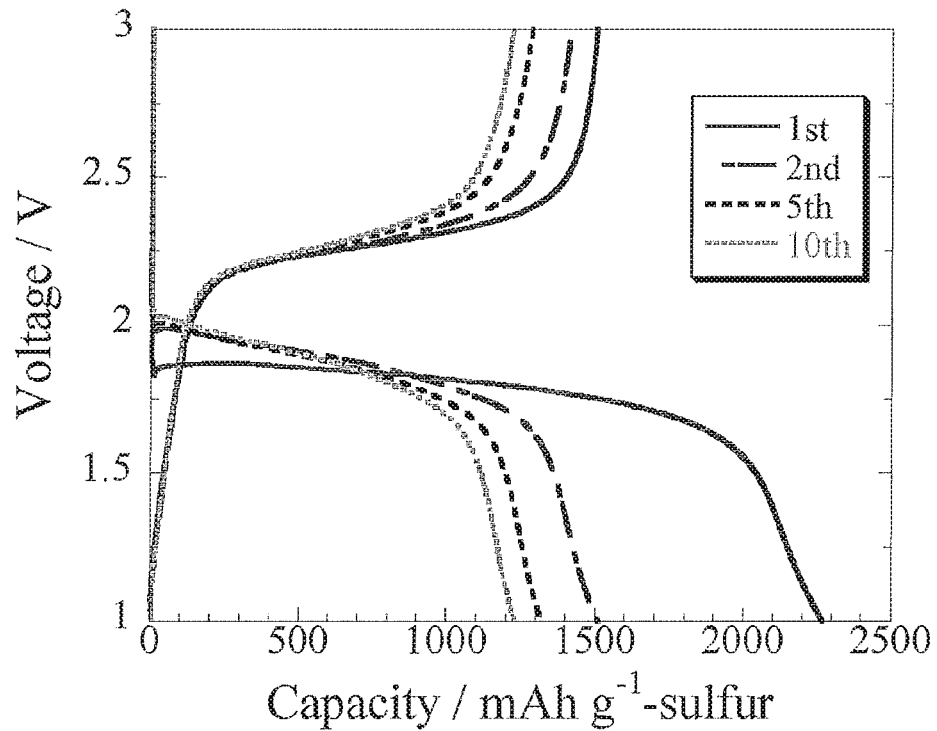
FIG. 1 is a graph illustrating charge and discharge behaviors of an alkali metal-sulfur-based secondary battery produced in Example 1.
Figure 2:
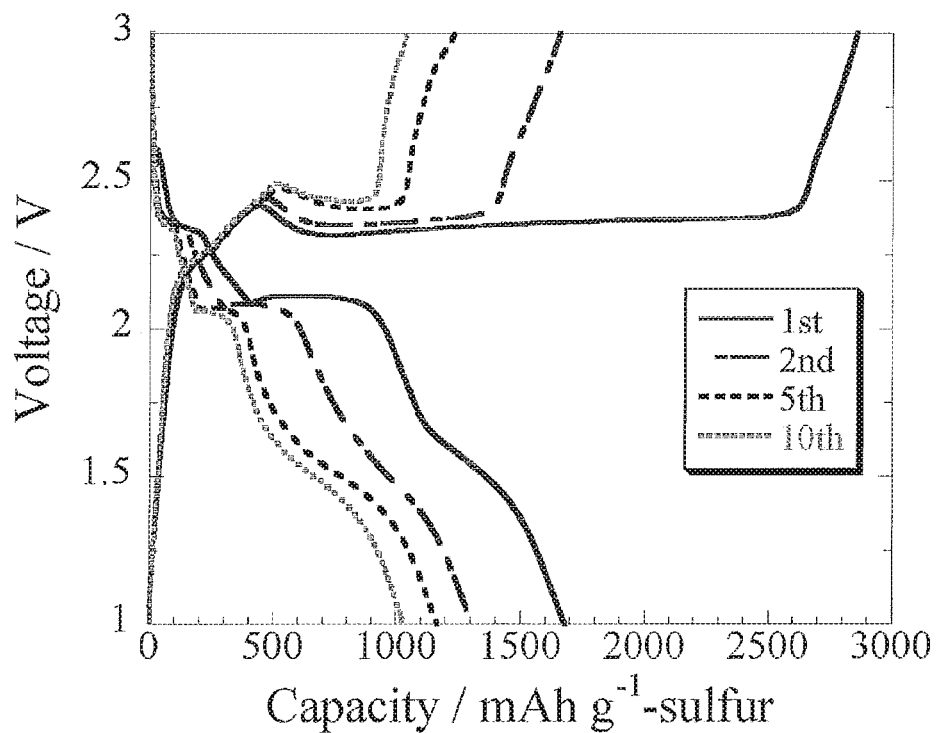
FIG. 2 is a graph illustrating charge and discharge behaviors of an alkali metal-sulfur-based secondary battery produced in Comparative Example 1.
Figure 3:
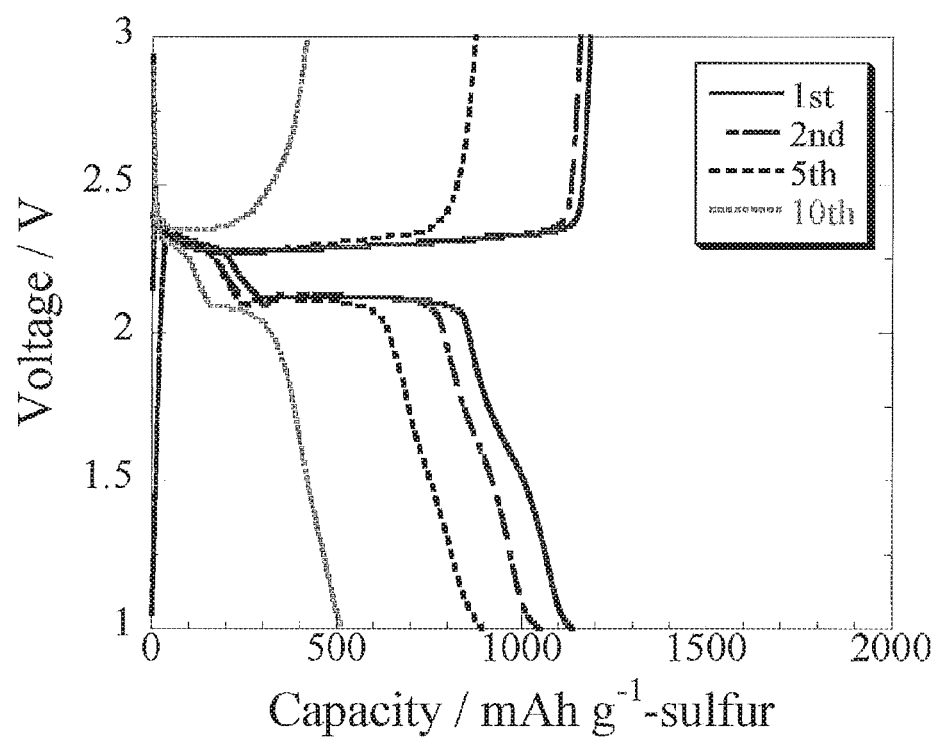
FIG. 3 is a graph illustrating charge and discharge behaviors of an alkali metal-sulfur-based secondary battery produced in Comparative Example 2.

The invention will be specifically described hereinbelow.

The electrolyte solution of the invention contains a fluorinated ether represented by the following formula (1):

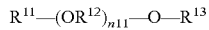

wherein $R^{11}$ and $R^{13}$ are the same as or different from each other, and are each an alkyl group optionally containing a fluorine atom, with at least one of $R^{11}$ or $R^{13}$ containing a fluorine atom; $R^{12}$ is an alkylene group optionally containing a fluorine atom; and n11 is 0, 1, or 2.

Preferably, n11 is 0.

The alkyl group is preferably a C1-C10 alkyl group, more preferably a C1-C5 alkyl group, still more preferably includes at least one selected from the group consisting of —$CH_3$, —$C_2H_5$, —$C_3H_7$, —$C_4H_9$, —$CF_2CF_2H$, —$CH_2CF_3$, —$CF_2CF_3$, —$CH_2CF_2CF_2H$, —$CH_2CF_2CF_3$, —$CF_2CHFCF_3$, and —$CF_2CF_2CF_3$.

The alkyl group may be linear or branched.

The alkylene group is preferably a C1-C3 alkylene group, more preferably includes at least one selected from the group consisting of —$CH_2CH_2$— and —$CF_2CF_2$—.

When n11 is 2, the two alkylene groups for $R^{12}$s may be the same as or different from each other.

The alkylene group may be linear or branched.

The fluorinated ether preferably includes at least one selected from the group consisting of $HCF_2CF_2CH_2OCF_2CHFCF_3$, $HCF_2CF_2CH_2OCF_2CF_2H$, $CF_3CF_2CH_2OCF_2CHFCF_3$, $CF_3CF_2CH_2OCF_2CF_2H$, $HCF_2CF_2OC_2H_5$, $HCF_2CF_2OC_3H_7$, $HCF_2CF_2OC_4H_9$, $CF_3CHFCF_2OC_2H_5$, and $CF_3CH_2OCH_2CH_2OCH_3$.

In order to achieve much better cycle performance and a much lower overvoltage, the electrolyte solution preferably contains the fluorinated ether in an amount of 0.001 to 60% by mass relative to the electrolyte solution. The amount of the fluorinated ether is more preferably 5% by mass or more, still more preferably 10% by mass or more, particularly preferably 20% by mass or more, while more preferably 50% by mass or less, still more preferably 40% by mass or less.

In order to achieve much better cycle performance and a much lower overvoltage, the electrolyte solution preferably further contains at least one selected from the group consisting of a fluorinated saturated cyclic carbonate, a fluorinated acyclic carbonate, and a fluorinated ester.

In order to achieve much better cycle performance and a much lower overvoltage, the electrolyte solution preferably contains at least one selected from the group consisting of a fluorinated saturated cyclic carbonate, a fluorinated acyclic carbonate, and a fluorinated ester in an amount of 0.001 to 99.999% by mass relative to the electrolyte solution. The amount thereof is more preferably 30% by mass or more, still more preferably 40% by mass or more, particularly preferably 50% by mass or more, while more preferably 95% by mass or less, still more preferably 90% by mass or less, particularly preferably 80% by mass or less, most preferably 60% by mass or less.

The fluorinated saturated cyclic carbonate is preferably one represented by the following formula (2):

[Chem. 7]

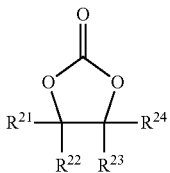

wherein $R^{21}$ to $R^{24}$ are the same as or different from each other, and are each —H, —$CH_3$, —F, a fluorinated alkyl group optionally containing an ether bond, or a fluorinated alkoxy group optionally containing an ether bond, with at least one of $R^{21}$ to $R^{24}$ being —F, a fluorinated alkyl group optionally containing an ether bond, or a fluorinated alkoxy group optionally containing an ether bond. The "ether bond" as used herein means a bond represented by —O—.

The fluorinated alkyl group is preferably one containing 1 to 10 carbon atoms, more preferably one containing 1 to 6 carbon atoms, still more preferably one containing 1 to 4 carbon atoms.

The fluorinated alkyl group may be linear or branched.

The fluorinated alkoxy group is preferably one containing 1 to 10 carbon atoms, more preferably one containing 1 to 6 carbon atoms, still more preferably one containing 1 to 4 carbon atoms.

The fluorinated alkoxy group may be linear or branched.

$R^{21}$ to $R^{24}$ are the same as or different from each other, and preferably include at least one selected from the group consisting of —H, —CH$_3$, —F, —CF$_3$, —C$_4$F$_9$, —CHF$_2$, —CH$_2$F, —CH$_2$CF$_2$CF$_3$, —CH$_2$—CF(CF$_3$)$_2$, —CH$_2$—O—CH$_2$CHF$_2$F$_2$H, —CH$_2$CF$_3$, and —CF$_2$CF$_3$.

In this case, at least one of $R^{21}$ to $R^{24}$ includes at least one selected from the group consisting of —F, —CF$_3$, —C$_4$F$_9$, —CHF$_2$, —CH$_2$F, —CH$_2$CF$_2$CF$_3$, —CH$_2$—CF(CF$_3$)$_2$, —CH$_2$—O—CH$_2$CHF$_2$F$_2$H, —CH$_2$CF$_3$, and —CF$_2$CF$_3$.

The fluorinated saturated cyclic carbonate preferably includes at least one selected from the group consisting of the following compounds.

[Chem. 8]

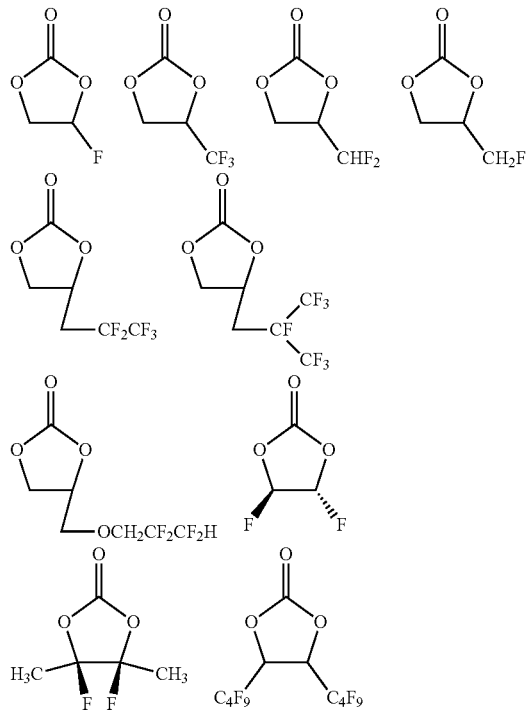

The fluorinated acyclic carbonate is preferably one represented by the following formula (3):

[Chem. 9]

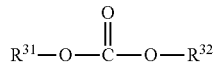

wherein $R^{31}$ and $R^{32}$ are the same as or different from each other, and are each an alkyl group optionally containing an ether bond and optionally containing a fluorine atom, with at least one of $R^{31}$ or $R^{32}$ containing a fluorine atom.

The alkyl group is preferably one containing 1 to 10 carbon atoms, more preferably one containing 1 to 6 carbon atoms, still more preferably one containing 1 to 4 carbon atoms.

The alkyl group may be linear or branched.

$R^{31}$ and $R^{32}$ are the same as or different from each other, and preferably include at least one selected from the group consisting of —CH$_3$, —CF$_3$, —CHF$_2$, —CH$_2$F, —C$_2$H$_5$, —CH$_2$CF$_3$, —CH$_2$CHF$_2$, and —CH$_2$CF$_2$CF$_2$H.

In this case, at least one of $R^{31}$ or $R^{32}$ includes at least one selected from the group consisting of —CF$_3$, —CHF$_2$, —CH$_2$F, —CH$_2$CHF$_2$, —CH$_2$CF$_3$, and —CH$_2$CF$_2$CF$_2$H.

The fluorinated acyclic carbonate preferably includes at least one selected from the group consisting of the following compounds.

[Chem. 10]

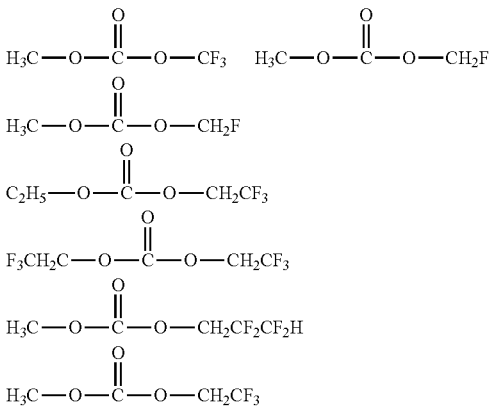

The fluorinated ester is preferably one represented by the following formula (4):

[Chem. 11]

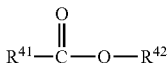

wherein $R^{41}$ and $R^{42}$ are the same as or different from each other, are each an alkyl group optionally containing an ether bond and optionally containing a fluorine atom, and optionally bind to each other to form a ring, with at least one of $R^{41}$ or $R^{42}$ containing a fluorine atom.

The alkyl group is preferably one containing 1 to 10 carbon atoms, more preferably one containing 1 to 6 carbon atoms, still more preferably one containing 1 to 4 carbon atoms.

The alkyl group may be linear or branched.

$R^{41}$ and $R^{42}$ are the same as or different from each other, and preferably include at least one selected from the group consisting of —CH$_3$, —C$_2$H$_5$, —CHF$_2$, —CH$_2$F, —CH(CF$_3$)$_2$, —CHFCF$_3$, —CF$_3$, and —CH$_2$CF$_3$.

In this case, at least one of $R^{41}$ or $R^{42}$ includes at least one selected from the group consisting of —CHF$_2$, —CH(CF$_3$)$_2$, —CHFCF$_3$, —CF$_3$, and —CH$_2$CF$_3$.

The expression "$R^{41}$ and $R^{42}$ bind to each other to form a ring" means that $R^{41}$ and $R^{42}$ form a ring together with the carbon atom and the oxygen atom to which $R^{41}$ and $R^{42}$ respectively bind, and $R^{41}$ and $R^{42}$ constitute parts of the ring as fluorinated alkylene groups. When $R^{41}$ and $R^{42}$ bind to each other to form a ring, $R^{4'}$ and $R^{42}$ preferably include at least one selected from the group consisting of —CH$_2$CH$_2$CH(CH$_2$CF$_3$)—, —CH(CF$_3$) CH$_2$CH$_2$—, —CHFCH$_2$CH$_2$—, —CH$_2$CH$_2$CHF—, and —CH$_2$CH$_2$CH (CF$_3$)—.

The fluorinated ester preferably includes at least one selected from the group consisting of the following compounds.

[Chem. 12]

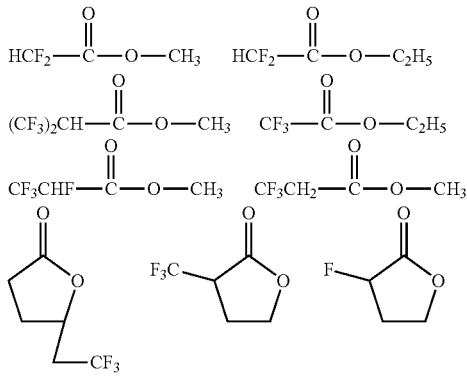

The electrolyte solution may further contain any of a non-fluorinated ether, a non-fluorinated saturated cyclic carbonate, a non-fluorinated acyclic carbonate, a non-fluorinated acyclic ester, a non-fluorinated cyclic ester, an unsaturated cyclic carbonate, polyethylene oxide, an overcharge inhibitor, an aid, a nitrogen-containing compound, a boron-containing compound, an organosilicon-containing compound, a fireproofing agent (a flame retarder), a surfactant, an additive for giving high dielectricity, a cycle performance improver, a rate performance improver, and an ion conductive compound.

Examples of the non-fluorinated ether include 1,2-dimethoxyethane, tetrahydrofuran, 2-methyltetrahydrofuran, 1,3-dioxolane, and 4-methyl-1,3-dioxolane.

Examples of the non-fluorinated saturated cyclic carbonate include ethylene carbonate, propylene carbonate, and butylene carbonate.

Examples of the non-fluorinated acyclic carbonate include dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butyl ethyl carbonate, isobutyl ethyl carbonate, and t-butyl ethyl carbonate.

In order to achieve much better cycle performance and a much lower overvoltage, the electrolyte solution preferably contains the fluorinated ether and at least one selected from the group consisting of the fluorinated saturated cyclic carbonate, the fluorinated acyclic carbonate, and the fluorinated ester in an amount of 75% by mass or more in total relative to the electrolyte solution. The amount thereof is more preferably 80% by mass or more, still more preferably 85% by mass or more. The upper limit thereof may be 100% by mass.

The electrolyte solution is preferably a non-aqueous electrolyte solution.

The electrolyte solution preferably further contains an electrolyte salt.

The electrolyte salt to be used may be any of those to be used for the electrolyte solution, such as a lithium salt, an ammonium salt, and a metal salt as well as a liquid salt (ionic liquid), an inorganic polymer form salt, and an organic polymer form salt.

The electrolyte salt is preferably a lithium salt.

Any lithium salt may be used. Specific examples thereof include the following:

inorganic lithium salts such as LiPF$_6$, LiBF$_4$, LiClO$_4$, LiAlF$_4$, LiSbF$_6$, LiTaF$_6$, and LiWF$_7$;

lithium tungstates such as LiWOF$_5$;

lithium carboxylates such as HCO$_2$Li, CH$_3$CO$_2$Li, CH$_2$FCO$_2$Li, CHF$_2$CO$_2$Li, CF$_3$CO$_2$Li, CF$_3$CH$_2$CO$_2$Li, CF$_3$CF$_2$CO$_2$Li, CF$_3$CF$_2$CF$_2$CO$_2$Li, and CF$_3$CF$_2$CF$_2$CF$_2$CO$_2$Li;

lithium sulfonates such as FSO$_3$Li, CH$_3$SO$_3$Li, CH$_2$FSO$_3$Li, CHF$_2$SO$_3$Li, CF$_3$SO$_3$Li, CF$_3$CF$_2$SO$_3$Li, CF$_3$CF$_2$CF$_2$SO$_3$Li, and CF$_3$CF$_2$CF$_2$CF$_2$SO$_3$Li;

lithium imide salts such as LiN(FCO)$_2$, LiN(FCO) (FSO$_2$), LiN(FSO$_2$)$_2$, LiN(FSO$_2$) (CF$_3$SO$_2$), LiN (CF$_3$SO$_2$)$_2$, LiN(C$_2$F$_5$SO$_2$)$_2$, lithium cyclic 1,2-perfluoroethanedisulfonylimide, lithium cyclic 1,3-perfluoropropanedisulfonylimide, and LiN(CF$_3$SO$_2$) (C$_4$F$_9$SO$_2$);

lithium methide salts such as LiC(FSO$_2$)$_3$, LiC(CF$_3$SO$_2$)$_3$, and LiC(C$_2$F$_5$SO$_2$)$_3$;

lithium oxalatoborates such as lithium difluorooxalatoborate and lithium bis(oxalato)borate;

lithium oxalatophosphates such as lithium tetrafluorooxalatophosphate, lithium difluorobis(oxalato)phosphate, and lithium tris(oxalato)phosphate; and fluorine-containing organic lithium salts such as salts represented by the formula: LiPF$_a$(C$_n$F$_{2n+1}$)$_{6-a}$ (wherein a is an integer of 0 to 5; and n is an integer of 1 to 6) (e.g., LiPF$_4$(CF$_3$)$_2$, LiPF$_4$(C$_2$F$_5$)$_2$, LiPF$_4$ (CF$_3$SO$_2$)$_2$, LiPO$_2$F$_2$, LiPF$_4$ (C$_2$F$_5$SO$_2$)$_2$, LiBF$_3$CF$_3$, LiBF$_3$C$_2$F$_5$, LiBF$_3$C$_3$F$_7$, LiBF$_2$ (CF$_3$)$_2$, LiBF$_2$ (C$_2$F$_5$)$_2$, LiBF$_2$ (CF$_3$SO$_2$)$_2$, and LiBF$_2$ (C$_2$F$_5$SO$_2$)$_2$.

Preferred among these are LiPF$_6$, LiBF$_4$, LiSbF$_6$, LiTaF$_6$, FSO$_3$Li, CF$_3$SO$_3$Li, LiN(FSO$_2$)$_2$, LiN(FSO$_2$) (CF$_3$SO$_2$), LiN(CF$_3$SO$_2$)$_2$, LiN(C$_2$F$_5$SO$_2$)$_2$, lithium cyclic 1,2-perfluoroethanedisulfonylimide, lithium cyclic 1,3-perfluoropropanedisulfonylimide, LiC(FSO$_2$)$_3$, LiC(CF$_3$SO$_2$)$_3$, LiC (C$_2$F$_5$SO$_2$)$_3$, lithium bis(oxalato)borate, lithium difluorooxalatoborate, lithium tetrafluorooxalatophosphate, lithium difluorobis(oxalato)phosphate, LiBF$_3$CF$_3$, LiBF$_3$C$_2$F$_5$, LiPF$_3$ (CF$_3$)$_3$, and LiPF$_3$(C$_2$F$_5$)$_3$.

More preferred is at least one selected from the group consisting of LiPF$_6$, LiBF$_4$, LiN(CF$_3$SO$_2$)$_2$ and LiN (C$_2$F$_5$SO$_2$)$_2$.

The electrolyte salt in the electrolyte solution may have any concentration that does not impair the effects of the invention. In order to make the electric conductivity of the electrolyte solution within a favorable range and to ensure good battery performance, the lithium in the electrolyte solution preferably has a total mole concentration of 0.3 mol/L or higher, more preferably 0.4 mol/L or higher, still more preferably 0.5 mol/L or higher, while preferably 4 mol/L or lower, more preferably 2.5 mol/L or lower, still more preferably 1.5 mol/L or lower.

The electrolyte solution of the invention is an electrolyte solution for an alkali metal-sulfur-based secondary battery that includes a positive electrode containing a carbon composite material that contains a carbon material and a sulfur-containing positive electrode active material.

Examples of the positive electrode active material include those containing a sulfur atom. Preferred is at least one selected from the group consisting of simple sulfur, a metal sulfide, a metal polysulfide, an organic polysulfide, and an organosulfur compound. More preferred is simple sulfur. An example of a sulfur-based metal sulfide is $Li_2S_x$ (wherein $0<x\leq 8$). An example of a sulfur-based metal polysulfide is $MS_x$ (wherein M=Ni, Cu, or Fe, $0<x\leq 2$). Examples of the organosulfur compound include an organic polysulfide, an organic disulfide compound, and a carbon sulfide compound.

In order to achieve much better cycle performance and a much lower overvoltage, the amount of the sulfur contained in the positive electrode active material in the carbon composite material is preferably 40 to 99% by mass, more preferably 50% by mass or more, still more preferably 60% by mass or more, while more preferably 90% by mass or less, still more preferably 85% by mass or less, relative to the carbon composite material. In the case of using simple sulfur as the positive electrode active material, the amount of the sulfur contained in the positive electrode active material is equal to the amount of the simple sulfur.

The amount of the sulfur can be determined by measuring the weight change under heating from room temperature to 600° C. at a temperature-increasing rate of 10° C./m in a helium atmosphere.

In order to achieve much better cycle performance and a much lower overvoltage, the amount of the carbon material in the carbon composite material is preferably 1 to 60% by mass, more preferably 10% by mass or more, still more preferably 15% by mass or more, while more preferably 45% by mass or less, still more preferably 40% by mass or less, relative to the positive electrode active material.

The carbon material includes pores. The "pores" as used herein include micropores, mesopores, and macropores. The micropores mean pores having a diameter of 0.1 nm or greater and smaller than 2 nm. The mesopores mean pores having a diameter of greater than 2 nm and 50 nm or smaller. The macropores mean pores having a diameter of greater than 50 nm.

The carbon material particularly used in the invention is a carbon material having a pore volume ratio (micropores/mesopores) of 1.5 or higher, the pore volume ratio being the ratio of the pore volume of the micropores to the pore volume of the mesopores. The pore volume ratio is more preferably 2.0 or higher. The upper limit of the pore volume ratio may be, but is not limited to, 3.0 or lower. The presence of the pores in the carbon material is presumed to greatly reduce dissolution of the positive electrode active material. The pore volume does not take the macropore volume into account.

The BET specific surface area, the average pore diameter, and the pore volume in the invention can be determined using a nitrogen adsorption isotherm obtained by allowing a sample (carbon material, carbon composite material) to adsorb nitrogen gas at the liquid nitrogen temperature. Specifically, the nitrogen adsorption isotherm may be used to determine the BET specific surface area of the sample by the Brenauer-Emmet-Telle (BET) method, and to determine the average pore diameter and pore volume of the sample by the quenched solid density functional theory (QSDFT). For example, these values may be measured using as a measurement device a specific surface area/pore distribution measurement device (Autosorb) available from Quantachrome Instruments.

In order to achieve much better cycle performance and a much lower overvoltage, the positive electrode active material is preferably contained in the pores of the carbon material in the carbon composite material. The presence of the positive electrode active material in the pores is presumed to greatly reduce dissolution of the positive electrode active material.

The presence of the positive electrode active material in the pores can be confirmed by measuring the BET specific surface area of the carbon composite material. The presence of the positive electrode active material in the pores causes the BET specific surface area of the carbon composite material to be smaller than the BET specific surface area of the carbon material alone.

The carbon material is preferably a porous carbon including macropores and mesopores.

In order to achieve much better cycle performance and a much lower overvoltage, the carbon material preferably has a BET specific surface area of 500 to 2500 $m^2/g$. The BET specific surface area is more preferably 700 $m^2/g$ or larger and 2000 $m^2/g$ or smaller.

In order to achieve much better cycle performance and a much lower overvoltage, the carbon material preferably has an average particle size of 1 to 50 nm. The average particle size is more preferably 2 nm or greater and 30 nm or smaller.

The carbon material may be produced by any production method, such as a method in which a composite of a readily degradable polymer and a not readily degradable (thermosetting) organic component is formed, and then the readily degradable polymer is removed from the composite. For example, the carbon material may be produced by preparing a regularly nanostructured polymer utilizing an organic-organic interaction between a phenol resin and a thermally degradable polymer, and then carbonizing the regularly nanostructured polymer.

The carbon composite material may be produced by any production method, such as a method in which the positive electrode active material is vaporized and allowed to deposit on the carbon material. The deposits may be heated at about 150° C., so that an excessive portion of the positive electrode active material may be removed.

The positive electrode may further contain any other components such as a binding agent, a thickening agent, and a conductive aid.

The binding agent may be any material that is stable against the electrolyte solution and a solvent used in electrode production.

Examples of the binding agent include resin-type polymers such as polyethylene, polypropylene, polyethylene terephthalate, polymethyl methacrylate, aromatic polyamide, chitosan, alginic acid, polyacrylic acid, polyimide, cellulose, and nitrocellulose; rubber-type polymers such as styrene-butadiene rubber (SBR), isoprene rubber, butadiene rubber, fluoroelastomers, acrylonitrile-butadiene rubber (NBR), and ethylene-propylene rubber; styrene-butadiene-styrene block copolymers and hydrogenated products thereof; thermoplastic elastomer-type polymers such as ethylene-propylene-diene terpolymers (EPDM), styrene-ethylene-butadiene-styrene copolymers, styrene-isoprene-styrene block copolymers, and hydrogenated products thereof; soft resin-type polymers such as syndiotactic-1,2-polybutadiene, polyvinyl acetate, ethylene-vinyl acetate copolymers, and propylene-α-olefin copolymers; fluorine-based polymers such as polyvinylidene fluoride, polytetrafluoroethylene, vinylidene fluoride copolymers, polyvinylidene fluoride, and tetrafluoroethylene-ethylene copolymers; and polymer compositions having an ion conductivity for an alkali metal ion (especially a lithium ion). These may be used alone or may be used in any combination of two or more at any ratio.

Examples of the thickening agent include carboxymethyl cellulose, methyl cellulose, and polyvinylpyrrolidone.

Examples of the conductive aid include particulate carbon, fibrous carbon, graphite, activated carbon, metal, metal compounds such as cobalt oxyhydroxide, and carbon-metal composites. Examples of the particulate carbon include carbon black, graphite, expanded graphite, porous carbon, carbon nanotube, carbon nanohorn, and Ketjenblack.

The positive electrode may further include a positive electrode current collector. The positive electrode current collector may be produced from any material. Any known material may be used. Specific examples thereof include metal materials such as aluminum, stainless steel, nickel-plated metal, titanium, and tantalum; and carbon materials such as carbon cloth and carbon paper. Preferred among these are metal materials, in particular aluminum.

In the case of a metal material, the current collector may be in the form of metal foil, metal cylinder, metal coil, metal plate, metal film, expanded metal, punched metal, or metal foam, for example. In the case of a carbon material, the current collector may be in the form of carbon plate, carbon film, or carbon cylinder, for example.

The positive electrode may be produced by forming, on the positive electrode current collector, a positive electrode active material layer containing the carbon composite material and optionally other components. The positive electrode active material layer may be formed by, for example, a method in which the carbon composite material and optionally components such as a binding agent and a thickening agent are mixed in a dry manner to provide a sheet, and this sheet is press-bonded to the positive electrode current collector, or a method in which these components are dissolved or dispersed in a liquid medium to provide slurry, and this slurry is applied to the positive electrode current collector and then dried.

A solvent to form the slurry may be any solvent that can dissolve or disperse the carbon composite material and other materials. Either an aqueous medium or an organic medium may be used. Examples of the aqueous medium include water and a solvent mixture of an alcohol and water.

Examples of the organic medium include aliphatic hydrocarbons such as hexane; aromatic hydrocarbons such as benzene, toluene, xylene, and methyl naphthalene; heterocyclic compounds such as quinoline and pyridine; ketones such as acetone, methyl ethyl ketone, and cyclohexanone; esters such as methyl acetate and methyl acrylate; amines such as diethylenetriamine and N,N-dimethylaminopropylamine; ethers such as diethyl ether, propylene oxide, and tetrahydrofuran (THF); amides such as N-methylpyrrolidone (NMP), dimethyl formamide, and dimethyl acetamide; and aprotic polar solvents such as hexamethylphosphoramide and dimethyl sulfoxide.

The amount of the carbon composite material in the positive electrode active material layer is preferably 40 to 99.5% by mass, more preferably 60% by mass or more, still more preferably 80% by mass or more, while more preferably 98% by mass or less, still more preferably 97% by mass or less, relative to the positive electrode active material layer.

The amount of the positive electrode active material in the positive electrode active material layer is preferably 20 to 90% by mass, more preferably 30% by mass or more, still more preferably 40% by mass or more, while more preferably 87% by mass or less, still more preferably 85% by mass or less, relative to the positive electrode active material layer.

The positive electrode current collector and the positive electrode active material layer may have any thickness ratio, and the ratio (thickness of positive electrode active material layer on one side before injection of electrolyte solution)/(thickness of current collector) is preferably 20 or lower, more preferably 15 or lower, most preferably 10 or lower. The lower limit thereof is preferably 0.5 or higher, more preferably 0.8 or higher, most preferably 1 or higher. A ratio exceeding this range may cause the current collector to generate heat due to Joule's heat during high-current-density charge and discharge. A ratio below this range may cause an increase in the volume ratio of the positive electrode current collector to the positive electrode active material, reducing the capacity of the battery.

The alkali metal-sulfur-based secondary battery may further include a negative electrode. The invention also relates to an alkali metal-sulfur-based secondary battery including the positive electrode, the negative electrode, and the electrolyte solution.

The alkali metal-sulfur-based secondary battery preferably exhibits a single main discharge plateau on and after the second cycle, and a reaction accompanied by $Li_2S_8$ represents 5% or less of all discharge reactions.

The number of discharge plateaux can be confirmed by a discharge curve on and after the second cycle obtained using the alkali metal-sulfur-based secondary battery. Each cycle is composed of charge at 25° C. at a constant current corresponding to 0.1 C until 3.0 V and discharge at a constant current of 0.1 C until 1.0 V.

The proportion of discharge owing to the reaction accompanied by $Li_2S_8$ can be determined by the following formula based on the capacity (1) in a discharge plateau region generated around 2.2 V owing to the reaction accompanied by $Li_2S_8$ and the capacity (2) in a discharge plateau region generated at and below 2.0 V owing to the other reactions in the second cycle discharge curve.

$$Li_2S_8 \text{ discharge proportion (\%)=capacity (1)/(capacity(1)+capacity(2))} \times 100$$

The negative electrode may contain a negative electrode active material. Examples of the negative electrode active material include a carbonaceous material, an alloyed material, and a lithium-containing metal composite oxide material.

The alloyed material to be used as the negative electrode active material may be any of those capable of occluding and releasing lithium, without limitation, including simple lithium, a simple metal and an alloy constituting a lithium alloy, and compounds such as oxides, carbides, nitrides, silicides, sulfides, and phosphides thereof. The simple metal and alloy constituting a lithium alloy are preferably materials containing a metal or semimetal element (i.e., excluding carbon) of the Group 13 or 14, more preferably a simple metal of aluminum, silicon, or tin (hereinafter, also abbreviated as a "specific metal element") or an alloy or compound containing any of these atoms. These may be used alone, or may be used in any combination of two or more at any ratio.

The negative electrode may further include a negative electrode current collector. The negative electrode current collector may be produced from any material. Any known material may be used. Specific examples thereof include metal materials such as aluminum, copper, titanium, nickel, stainless steel, and nickel-plated steel.

In the case of a metal material, the negative electrode current collector may be in the form of metal foil, metal cylinder, metal coil, metal plate, metal film, expanded metal, punched metal, or metal foam, for example.

The negative electrode may be produced by forming, on the negative electrode current collector, a negative electrode active material layer containing the negative electrode active material and optionally other components. The negative electrode may be formed by, for example, mixing the negative electrode active material with materials such as a binding agent, a solvent, a thickening agent, a conductive material, and filler to provide slurry, applying this slurry to the negative electrode current collector, and then drying and pressing the workpiece.

In the case of an alloyed material, vapor deposition, sputtering, plating, or the like may be used to form a film layer containing the negative electrode active material (negative electrode active material layer).

The negative electrode active material layer having a predetermined shape (e.g., a rectangular or circular shape) may also be punched from lithium foil.

The negative electrode current collector and the negative electrode active material layer may have any thickness ratio, and the ratio (thickness of negative electrode active material layer on one side before injection of electrolyte solution)/(thickness of current collector) is preferably 150 or lower, still more preferably 20 or lower, particularly preferably 10 or lower, while preferably 0.1 or higher, still more preferably 0.4 or higher, particularly preferably 1 or higher. A ratio of the thicknesses between the negative electrode current collector and the negative electrode active material layer exceeding the above range may cause the current collector to generate heat due to Joule's heat during high-current-density charge and discharge. A ratio below the above range may cause an increase in the volume ratio of the negative electrode current collector to the negative electrode active material, reducing the capacity of the battery.

The alkali metal-sulfur-based secondary battery may further include a separator. A separator is usually placed between the positive electrode and the negative electrode to prevent a short circuit. In this case, this separator is impregnated with the electrolyte solution.

The separator may be formed from any material and may have any shape. Any known material and shape may be applicable as long as they do not significantly impair the effects of the invention. Particularly used is resin, glass fiber, an inorganic substance, or the like formed from a material stable against the electrolyte solution. Preferred is one in the form of porous sheet or nonwoven fabric having excellent liquid retention.

Examples of materials of a resin or glass fiber separator include polyolefins such as polyethylene and polypropylene, aromatic polyamides, polytetrafluoroethylene, polyethersulfone, and glass filters. Preferred among these are glass filters and polyolefins, still more preferred are polyolefins. These materials may be used alone, or may be used in any combination of two or more at any ratio.

The separator may have any thickness that is usually 1 µm or greater, preferably 5 µm or greater, still more preferably 8 µm or greater, while usually 50 µm or smaller, preferably 40 µm or smaller, still more preferably 30 µm or smaller. The separator having a thickness very smaller than the above range may cause reduced insulation and mechanical strength. The separator having a thickness very greater than the above range may cause not only reduced battery performance such as rate performance, but also a reduced energy density of the battery.

In the case of using porous one such as a porous sheet or nonwoven fabric as the separator, the separator may have any porosity that is usually 20% or higher, preferably 35% or higher, still more preferably 45% or higher, while usually 90% or lower, preferably 85% or lower, still more preferably 75% or lower. A porosity very lower than the above range tends to cause a high membrane resistance, resulting in poor rate performance. A porosity very higher than the above range tends to cause reduced mechanical strength of the separator, resulting in poor insulation.

The separator may also have any average pore size that is usually 0.5 µm or smaller, preferably 0.2 µm or smaller, while usually 0.05 µm or greater. An average pore size exceeding the above range may easily cause a short circuit. An average pore size below the above range may cause a high membrane resistance, resulting in poor rate performance.

Examples of the inorganic material used include oxides such as alumina and silicon dioxide, nitrides such as aluminum nitride and silicon nitride, and sulfates such as barium sulfate and calcium sulfate. Those in the form of particles or fibers may be used.

The separator may be one having a thin film shape such as nonwoven fabric, woven fabric, or a fine porous film. The thin film-shaped separator to be preferably used has a pore size of 0.01 to 1 µm and a thickness of 5 to 50 µm. In addition to the above discrete thin film shaped one, a binding agent formed from resin may be used to form a separator that includes a composite porous layer containing particles of the inorganic substance on the outer layer(s) of the positive electrode and/or the negative electrode. For example, a fluororesin may be used as a binding agent to form porous layers from alumina particles having a 90% particle size of smaller than 1 µm on both surfaces of the positive electrode.

The alkali metal-sulfur-based secondary battery may further include an external housing. The alkali metal-sulfur-based secondary battery usually has a structure in which the aforementioned components such as the electrolyte solution, the negative electrode, the positive electrode, and the separator are accommodated in the external housing. This external housing may be any of known housings as long as it does not significantly impair the effects of the invention. Specifically, the external housing may be formed from any material, and is usually formed from nickel-plated iron, stainless steel, aluminum or an alloy thereof, nickel, titanium, or the like.

The external housing may have any shape such as a cylindrical shape, a square shape, a laminate shape, a coin shape, or a large-scale shape. The shapes and structures of the positive electrode, the negative electrode, and the separator may be modified in accordance with the shape of the battery.

A module including the aforementioned alkali metal-sulfur-based secondary battery is also one aspect of the invention.

EXAMPLES

The invention is described with reference to examples, but the examples are not intended to limit the invention.

Examples and Comparative Examples (Preparation of Electrolyte Solution)

The components were mixed at the proportions shown in Table 1 or Table 2. A lithium salt was added thereto so as to have a concentration of 1.0 mol/L. Thereby, a non-aqueous electrolyte solution was obtained.

(Production of Coin-Shaped Alkali Metal-Sulfur-Based Secondary Battery)

A carbon composite material (sulfur content: 65% by mass) containing a carbon material (whose pore volume ratio is shown in Table 1 or Table 2) and a predetermined sulfur serving as a positive electrode active material, carbon black serving as a conductive material, carboxymethyl cellulose (CMC) dispersed in pure water, and styrene-butadiene rubber were mixed at a solid content ratio of 90/5/2.5/2.5 (mass % ratio). Thereby, positive electrode mixture slurry was prepared. The resulting positive electrode mixture slurry was uniformly applied to an aluminum foil current collector having a thickness of 20 μm, and then dried and compression molded using a press. Thereby, a positive electrode was formed. This positive electrode laminate was punched using a punch, whereby a circular positive electrode having a diameter of 1.6 cm was produced.

Separately, a circular lithium foil piece punched to have a diameter of 1.6 cm was used as a negative electrode.

The positive electrode and the negative electrode were placed so as to face each other with a 20-μm-thick fine porous polyethylene film (separator) in between. The non-aqueous electrolyte solution obtained above was injected and the electrolyte solution was made to sufficiently infiltrate into the components such as the separator. Then, the workpiece was sealed, pre-charged, and aged. Thereby, a coin-shaped alkali metal-sulfur-based secondary battery was produced.

(Measurement of Battery Performance)

For the resulting coin-shaped alkali metal-sulfur-based secondary battery, the cycle performance and the proportion of the $Li_2S_8$ discharge plateau were examined as follows.

(Cycle Test)

The secondary battery produced above was charged at 25° C. at a constant current corresponding to 0.1 C until 3.0 V, and then discharged at a constant current of 0.1 C until 1.0 V. These charge and discharge constitute one cycle. The initial discharge capacity was determined from the discharge capacity of the first cycle. Here, 1 C means the current value at which the reference capacity of the battery is discharged over one hour. For example, 0.1 C means 1/10 of this current value. The cycle was repeated, and the discharge capacity after the 50th cycle was taken as the capacity after the cycles. The ratio of the discharge capacity after the 50th cycle to the initial discharge capacity was determined, and this value was taken as the cycle capacity retention (%).

Cycle capacity retention (%)=(discharge capacity after 50th cycle)/(initial discharge capacity)×100

(Pore Volume Ratio (Micropores/Mesopores))

The nitrogen adsorption isotherm of the carbon material contained in the carbon composite material was obtained using a specific surface area/pore distribution measurement device (Autosorb) available from Quantachrome Instruments. The pore volume ratio of the micropores to the mesopores was determined from the nitrogen adsorption isotherm by the quenched solid density functional theory (QSDFT).

(Proportion of Discharge Plateau Owing to Reaction Accompanied by $Li_2S_8$) In the discharge curve of the second cycle in the cycle test, the plateau generated around 2.2 V was defined as the discharge owing to the reaction accompanied by $Li_2S_8$ and the plateaux generated at and below 2.0 V were defined as the discharge plateaux owing to the other reactions. The proportion of the discharge owing to the reaction accompanied by $Li_2S_8$ was calculated from the whole discharge capacity.

Proportion of $Li_2S_8$ discharge (%)=(capacity of $Li_2S_8$ discharge plateau region)/((capacity of $Li_2S_8$ discharge plateau region)+(capacity of other discharge plateau regions))×100

The items in Table 1 and Table 2 represent the following compounds.

Component (I)

[Chem. 13]

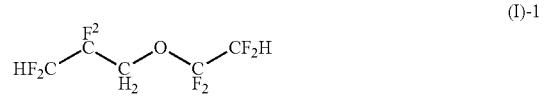
(I)-1

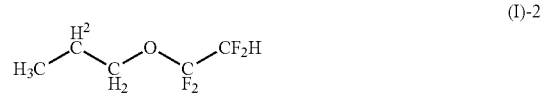
(I)-2

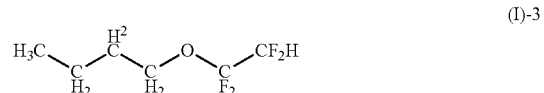
(I)-3

Component (II)

[Chem. 14]

(II)-1

(II)-2

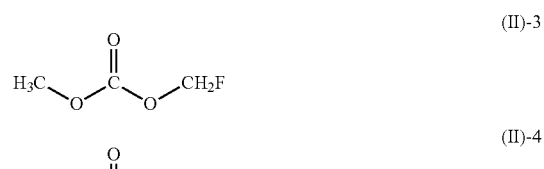
(II)-3

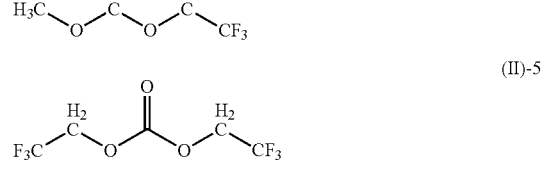
(II)-4

(II)-5

(II)-6

-continued

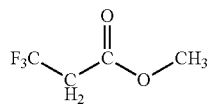

(II)-7

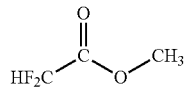

(II)-8

Other Components
EC: ethylene carbonate
EMC: ethyl methyl carbonate
DME: 1,2-dimethoxyethane
DOL: 1,3-dioxolane
Lithium Salt

[Chem. 15]

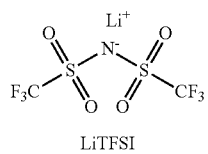

LiTFSI

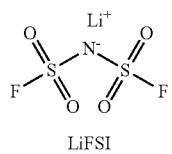

LiFSI

TABLE 1

|  | Example 1 | Comparative Example 1 | Comparative Example 2 |
|---|---|---|---|
| Pore volume ratio (micropores/mesopores) | 2.1 | 2.1 | 1.4 |
| Component (I) | (I)-1 60 |  | (I)-1 60 |
| Component (II) | (II)-1 40 | (II)-1 30 | (II)-1 40 |
| Other components |  | DME 40 DOL 30 |  |
| Lithium salt | LiTFSI | LiTFSI | LiTFSI |
| Li$_2$S$_8$ discharge proportion (%) | 0.1 | 13.8 | 17.1 |
| Cycle capacity retention (%) | 44 | 15 | 18 |

TABLE 2

|  | Example 2 | Example 3 | Example 4 | Example 5 | Example 6 | Example 7 | Example 8 | Example 8 | Example 10 | Example 11 | Example 12 |
|---|---|---|---|---|---|---|---|---|---|---|---|
| Pore volume ratio | 2.11 | 1.62 | 1.51 | 2.11 | 2.11 | 2.11 | 2.11 | 2.11 | 2.11 | 2.11 | 2.11 |
| Component (I) | (I)-1 50 | (I)-1 50 | (I)-1 50 | (I)-2 50 | (I)-3 50 | (I)-2 30 | (I)-2 15 | (I)-2 55 | (I)-2 40 | (I)-2 40 | (I)-2 40 |
| Component (II) | (II)-1 50 | (II)-1 50 | (II)-1 50 | (II)-1 50 | (II)-1 50 | (II)-1 50 (II)-5 20 | (II)-1 50 (II)-5 20 | (II)-2 45 | (II)-1 20 (II)-3 40 | (II)-1 20 (II)-4 40 | (II)-1 20 (II)-5 40 |
| Other components |  |  |  |  |  |  | DME 15 |  |  |  |  |
| Lithium salt | LiTFSI | LiTFSI | LiTFSI | LiTFSI | LiTFSI | LiTFSI | LiTFSI | LiTFSI | LiTFSI | LiPF$_6$ | LiPF$_6$ |
| Li$_2$S$_8$ discharge proportion (%) | 0.4 | 1.2 | 1.4 | 0.5 | 0.8 | 0.2 | 1.1 | 1.8 | 2.1 | 2.2 | 2.1 |
| Cycle capacity retention (%) | 46 | 45 | 43 | 44 | 46 | 48 | 40 | 39 | 42 | 41 | 40 |

|  | Example 13 | Example 14 | Example 15 | Example 16 | Example 17 | Example 18 | Example 19 | Comparative Example 3 | Comparative Example 4 | Comparative Example 5 | Comparative Example 6 | Comparative Example 7 |
|---|---|---|---|---|---|---|---|---|---|---|---|---|
| Pore volume ratio | 2.11 | 2.11 | 2.11 | 2.11 | 2.11 | 2.11 | 2.11 | 1.4 | 1.1 | 2.11 | 2.11 | 2.11 |
| Component (I) | (I)-2 40 | (I)-2 40 | (I)-2 40 | (I)-1 30 | (I)-1 20 | (I)-1 20 | (I)-2 8 | (I)-1 60 | (I)-2 60 |  |  |  |
| Component (II) | (II)-6 60 | (II)-1 20 (II)-7 40 | (II)-1 20 (II)-8 40 | (II)-2 40 | (II)-1 20 (II)-3 10 | (II)-1 20 (II)-3 30 | (II)-1 20 (II)-3 30 | (II)-1 40 | (II)-1 40 | (II)-1 50 | (II)-1 50 (II)-3 50 | (II)-1 20 (II)-7 80 |
| Other components |  |  |  | DOL 30 | EMC 50 | EC 30 | EC 12 EMC 30 |  |  | DME 20 DOL 30 |  |  |
| Lithium salt | LiPF$_6$ | LiPF$_6$ | LiPF$_6$ | LiTFSI | LiPF$_6$ | LiPF$_6$ | LiTFSI | LiTFSI | LiTFSI | LiTFSI | LiPF$_6$ | LiTFSI |
| Li$_2$S$_8$ discharge proportion (%) | 1.8 | 3.1 | 2.8 | 4.4 | 4.8 | 4.9 | 4.7 | 17.1 | 35 | 20 | 18 | 21 |
| Cycle capacity retention (%) | 41 | 39 | 38 | 36 | 33 | 32 | 28 | 18 | 3 | 5 | 11 | 9 |

The invention claimed is:

1. An alkali metal-sulfur-based secondary battery comprising a positive electrode, a negative electrode, and an electrolyte solution,
the positive electrode containing a carbon composite material that contains a carbon material having a pore volume ratio (micropores/mesopores) of 1.5 to 3.0, and a sulfur-containing positive electrode active material containing simple sulfur,
the electrolyte solution containing a fluorinated ether represented by the following formula (1):

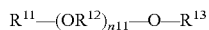
$R^{11}-(OR^{12})_{n11}-O-R^{13}$ wherein $R^{11}$ and $R^{13}$ are the same as or different from each other, and are each an alkyl group optionally containing a fluorine atom, with at least one of $R^{11}$ or $R^{13}$ containing a fluorine atom; $R^{12}$ is an alkylene group optionally containing a fluorine atom; and n11 is 0, 1, or 2,
wherein the electrolyte solution further contains at least one selected from the group consisting of a fluorinated saturated cyclic carbonate, a fluorinated acyclic carbonate, and a fluorinated ester,
the fluorinated saturated cyclic carbonate is represented by the following formula (2):

[Chem. 4]

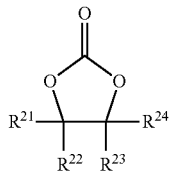

wherein $R^{21}$ to $R^{24}$ are the same as or different from each other, and are each —H, —CH$_3$, —F, a fluorinated alkyl group optionally containing an ether bond, or a fluorinated alkoxy group optionally containing an ether bond, with at least one of $R^{21}$ to $R^{24}$ being —F, a fluorinated alkyl group optionally containing an ether bond, or a fluorinated alkoxy group optionally containing an ether bond,
the fluorinated acyclic carbonate is represented by the following formula (3):

[Chem. 5]

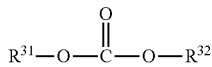

wherein $R^{31}$ and $R^{32}$ are the same as or different from each other, and are each an alkyl group optionally containing an ether bond and optionally containing a fluorine atom, with at least one of $R^{31}$ or $R^{32}$ containing a fluorine atom, and
the fluorinated ester is represented by the following formula (4):

[Chem. 6]

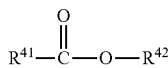

wherein $R^{41}$ and $R^{42}$ are the same as or different from each other, are each an alkyl group optionally containing an ether bond and optionally containing a fluorine atom, and optionally bind to each other to form a ring, with at least one of $R^{41}$ or $R^{42}$ containing a fluorine atom,
wherein the alkali metal-sulfur-based secondary battery exhibits a single main discharge plateau on and after the second cycle, and a reaction accompanied by Li$_2$S$_8$ represents 5% or less of all discharge reactions.

2. A module comprising the alkali metal-sulfur-based secondary battery according to claim 1.

3. An alkali metal-sulfur-based secondary battery comprising a positive electrode, a negative electrode, and an electrolyte solution,
the positive electrode containing a carbon composite material that contains a carbon material having a pore volume ratio (micropores/mesopores) of 1.5 to 3.0, and a sulfur-containing positive electrode active material,
the electrolyte solution containing a fluorinated ether represented by the following formula (1):

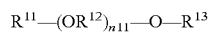
$R^{11}-(OR^{12})_{n11}-O-R^{13}$ wherein $R^{11}$ and $R^{13}$ are the same as or different from each other, and are each an alkyl group optionally containing a fluorine atom, with at least one of $R^{11}$ or $R^{13}$ containing a fluorine atom; $R^{12}$ is an alkylene group optionally containing a fluorine atom; and n11 is 0, 1, or 2,
wherein the electrolyte solution further contains at least one selected from the group consisting of a fluorinated saturated cyclic carbonate, a fluorinated acyclic carbonate, and a fluorinated ester,
the fluorinated saturated cyclic carbonate is represented by the following formula (2):

[Chem. 4]

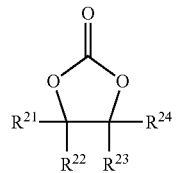

wherein $R^{21}$ to $R^{24}$ are the same as or different from each other, and are each —H, —CH$_3$, —F, a fluorinated alkyl group optionally containing an ether bond, or a fluorinated alkoxy group optionally containing an ether bond, with at least one of $R^{21}$ to $R^{24}$ being —F, a fluorinated alkyl group optionally containing an ether bond, or a fluorinated alkoxy group optionally containing an ether bond,
the fluorinated acyclic carbonate is represented by the following formula (3):

[Chem. 5]

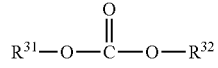

wherein $R^{31}$ and $R^{32}$ are the same as or different from each other, and are each an alkyl group optionally containing an ether bond and optionally containing a fluorine atom, with at least one of $R^{31}$ or $R^{32}$ containing a fluorine atom, and the fluorinated ester is represented by the following formula (4):

[Chem. 6]

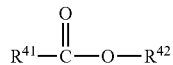

wherein $R^{41}$ and $R^{42}$ are the same as or different from each other, are each an alkyl group optionally containing an ether bond and optionally containing a fluorine atom, and optionally bind to each other to form a ring, with at least one of $R^{41}$ or $R^{42}$ containing a fluorine atom, wherein the alkali metal-sulfur-based secondary battery exhibits a single main discharge plateau on and after the second cycle, and a reaction accompanied by $Li_2S_8$ represents 5% or less of all discharge reactions.

4. A module comprising the alkali metal-sulfur-based secondary battery according to claim 3.

* * * * *